July 19, 1932.     H. FURNESS     1,868,058
MACHINERY FOR MAKING BISCUITS AND LIKE BAKED PRODUCTS
Filed Oct. 8, 1931     2 Sheets-Sheet 1

Inventor,
Harold Furness,
Per
Byrnes Townsend & Potter,
Attnys.

July 19, 1932.  H. FURNESS  1,868,058
MACHINERY FOR MAKING BISCUITS AND LIKE BAKED PRODUCTS
Filed Oct. 8, 1931  2 Sheets-Sheet 2
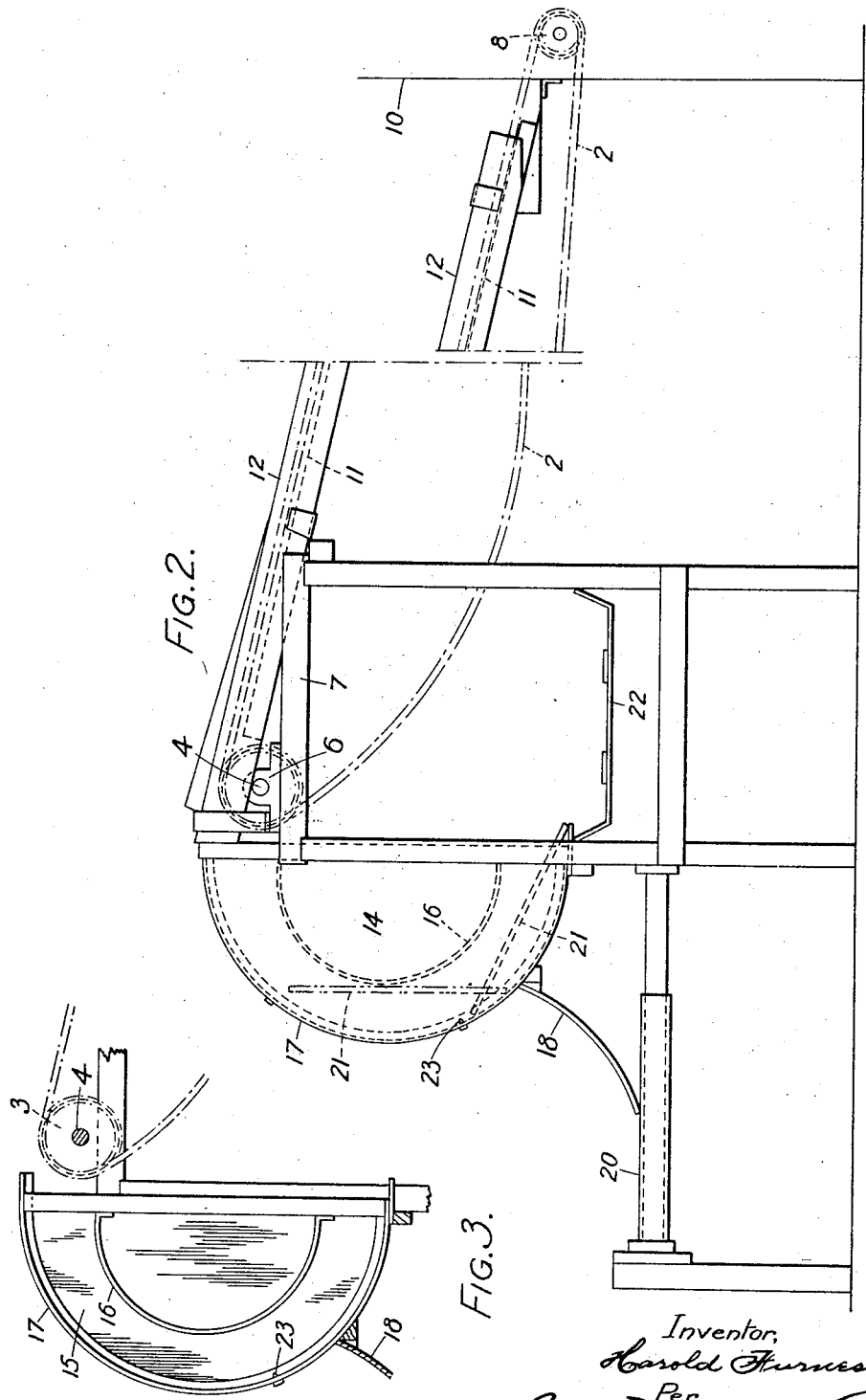

Patented July 19, 1932

1,868,058

UNITED STATES PATENT OFFICE

HAROLD FURNESS, OF CARLISLE, ENGLAND, ASSIGNOR TO CARR & COMPANY LIMITED, OF CARLISLE, ENGLAND

MACHINERY FOR MAKING BISCUITS AND LIKE BAKED PRODUCTS

Application filed October 8, 1931, Serial No. 567,696, and in Great Britain September 10, 1930.

The present invention relates to machinery for making biscuits and like baked products, hereinafter referred to as "biscuits".

The object of this invention is to provide means for automatically removing the biscuits from the baking pans or wires upon which they are baked after the latter have passed through the ovens. The biscuits are then fed, say, to a conveyor leading to the packing apparatus, whilst the empty pans or wires (these two elements being hereinafter referred to for convenience as pans) are returned ready for use again.

According to this invention I provide in biscuit making machinery, means for the automatic removal of the biscuits from the pans, upon which they are baked, after the latter have passed through the ovens, comprising a conveyor leading from the oven to a discharge point where the pans are inverted to remove the biscuits, the latter falling into a chute which guides them to a conveyor associated with the packing arrangements.

According to one construction, the pans loaded with biscuits, after coming from the ovens, are elevated by conveyor to a discharge point, where they are allowed to fall by gravity, but under the control of a guide or guides, which inverts the pans to effect the removal of the biscuits.

In an alternative construction the pans may be positively driven into an inverted position, instead of being allowed to fall by gravity.

The drawings filed herewith show one embodiment of this invention whereof:—

Fig. 2 is a side elevation of Fig. 1, and

Fig. 3 is a detail sectional view of part of Fig. 1.

Figure 1:
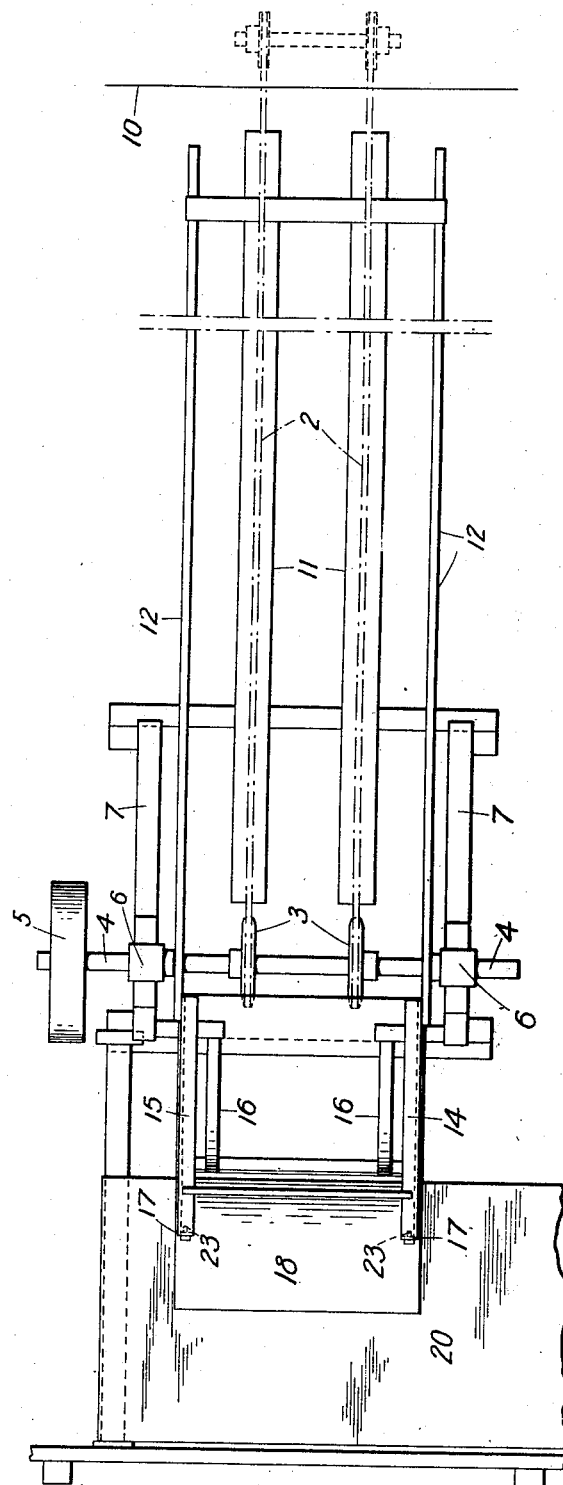
Fig. 1 is a plan view of the apparatus.

Referring to the drawings the apparatus comprises a pair of chains 2 which run on sprockets 3 carried by a power shaft 4 which is furnished with a driving pulley 5. The power shaft 4 is mounted in a bearing 6 carried by a frame work 7. The other end of the chain conveyor 2 runs on sprockets 8 one of which can be seen in Fig. 2.

The line 10 represents the front of the oven and the function of the conveyor 2 is to receive the pans after passing through the ovens and to convey them upwardly to the discharge end of the conveyor.

The top portion of the conveyor 2 slopes upwardly to the discharge point and runs on supporting rails 11 carried by the frame work 7 at the upper end and supported on the front of the oven 10 at the lower end. (See Fig. 2.) Lateral guide rails 12 are also provided to maintain the pans or wires in position on the conveyor 2.

In accordance with the invention means are provided at the discharge end of the conveyor 2 for inverting the pans to remove the biscuits on to a conveyor employed in connection with the packing arrangements. The mechanism for inverting the pans comprises two vertical guide plates 14 and 15 on the inner surface of which are disposed inner and outer guides of semi-circular shape designated 16 and 17 respectively. The arrangement is such that the outer semi-circular guides 17 engage the top surface of the pans whilst the inner semi-circular guides 16 engage the bottom surface of the pans. As the pans fall over the end of the conveyor 2, they are compelled to travel in a semi-circular path by gravity and as they reach a vertical position, the biscuits fall off and are collected by a chute 18 adapted to break their fall and guide them on to a conveyor 20 employed in connection with the packing arrangements. The pans, two positions of which are shown in dotted lines in Fig. 2 and indicated by the reference numerals 21, continue to travel round the semi-circular guides until they are completely inverted.

Owing to the momentum which the pans gain whilst travelling through the guides they are caused to shoot outwardly on to a conveyor 22 (see Fig. 2) which removes the pans in a direction, preferably at right angles to the conveyor 2, and collects them for use again.

In some cases it has been found desirable to employ studs 23 secured to the outer semi-circular guide 17, which serve to check the passage of the pans momentarily with the object of facilitating the removal of the biscuits therefrom.

Instead of allowing the pans to fall from the discharge point of the conveyor 2 by gravity, their passage through the guides may be assisted mechanically, such as by rollers driven from a source of power.

If desired, the guides 16 and 17 may be furnished with, or replaced by, a series of rollers so arranged as to constitute the guide or guides for the pans.

What I claim is:—

1. In biscuit making machinery, means for the automatic removal of the biscuits from the pans, upon which they are baked, after the said pans have passed through the ovens, comprising a conveyor leading from the oven to a discharge point, means for removing the said pans from the conveyor, means for inverting the said pans to remove the biscuits, said means comprising outer and inner substantially semi-circular guides between which the said pans are allowed to fall, and a chute adapted to receive said biscuits and guide them to the packing arrangements.

2. Apparatus for removing baked products from pans comprising, in combination, a conveyor for said pans, and means cooperating with said conveyor for inverting said pans to thereby remove the products including an arcuate guideway for engaging said pans throughout the entire inverting movement.

3. The invention as set forth in claim 2, wherein is provided means for imparting a shock to each of said pans to thereby assist in dislodging the baked products, said means including a projection formed on said guideway and disposed to engage each of said pans as it passes through the guideway.

4. The invention as set forth in claim 2, wherein said guide-way is provided with an outlet for said product and another outlet for said pans.

5. Apparatus for removing baked products from pans comprising, in combination, a conveyor for said pans, and means for inverting said pans including an arcuate guide-way terminating adjacent the delivery end of said conveyor and having an outlet for the baked products intermediate its ends.

6. Apparatus for removing baked products from pans comprising, means including an arcuate guideway for inverting the pans, through which guideway the pans pass by gravitational action, means for transporting the pans to the guideway, means including studs formed on said guideway for temporarily arresting the passage of the pans, and means for guiding the products from the guideway after removal.

HAROLD FURNESS.